United States Patent
Arambepola et al.

(10) Patent No.: US 8,059,687 B2
(45) Date of Patent: Nov. 15, 2011

(54) ALGORITHM FOR MANAGING DATA LOSS IN SOFTWARE DEMODULATORS

(75) Inventors: Bernard Arambepola, Middlesex (GB); Tony Cole, Swindon (GB); Parveen Shukla, Nottingham (GB); Thushara Hewavithana, Borehamwood (GB); Sahan Gamage, Cambridge (GB)

(73) Assignee: Intel Corporation, Santa Clara, CA (US)

( * ) Notice: Subject to any disclaimer, the term of this patent is extended or adjusted under 35 U.S.C. 154(b) by 51 days.

(21) Appl. No.: 12/316,876

(22) Filed: Dec. 16, 2008

(65) Prior Publication Data

US 2010/0150180 A1  Jun. 17, 2010

(51) Int. Cl.
*H04J 3/06* (2006.01)
(52) U.S. Cl. ........................................ 370/503
(58) Field of Classification Search .................. None
See application file for complete search history.

(56) References Cited

U.S. PATENT DOCUMENTS

| | | | |
|---|---|---|---|
| 6,038,231 A * | 3/2000 | Dolby et al. | 370/394 |
| 6,219,339 B1 | 4/2001 | Doshi et al. | |
| 6,658,027 B1 * | 12/2003 | Kramer et al. | 370/516 |
| 2006/0153217 A1 * | 7/2006 | Chu et al. | 370/412 |
| 2006/0259849 A1 * | 11/2006 | Conway | 714/776 |
| 2008/0025700 A1 * | 1/2008 | Ito et al. | 386/98 |
| 2008/0209477 A1 * | 8/2008 | Koppelaar et al. | 725/62 |
| 2008/0225958 A1 * | 9/2008 | Park et al. | 375/240.25 |
| 2009/0022165 A1 * | 1/2009 | Candelore et al. | 370/400 |
| 2009/0052541 A1 * | 2/2009 | Kang et al. | 375/240.24 |

OTHER PUBLICATIONS

Gupta, Ajay G., et al., Title: "Method and Apparatus for Reducing Power Consumption for Isochronous Data Transfers", U.S. Appl. No. 11/966,118, filed Dec. 28, 2007.

Extended European Search Report received for European Patent Application No. 09179348.9, mailed on Mar. 16, 2010, 7 pages of European Search Report.

Office action received for European Patent Application No. 09179348.9, mailed on Jan. 14, 2011, 1 page of European Office action.

* cited by examiner

*Primary Examiner* — Min Jung

(57) ABSTRACT

Embodiments of methods for receiving and processing multi-band signals in wideband and narrowband environments are described herein. Other embodiments may be described and claimed.

19 Claims, 6 Drawing Sheets

ALGORITHM FOR MANAGING DATA LOSS IN SOFTWARE DEMODULATORS

FIELD OF THE INVENTION

The field of invention relates generally to a multi-band wireless system and more specifically but not exclusively relates to methods for receiving and processing multi-band signals in wideband and/or narrowband environments.

BACKGROUND INFORMATION

Technological developments permit digitization of large amounts of voice, video, imaging, and data information from a transmitting station to a receiving station. One emerging application is the deployment of digital television, including handheld-oriented broadcast services that can withstand mobility of the receiving stations. For example, digital video broadcasting-handheld (DVB-H) and terrestrial-digital multimedia broadcasting (T-DMB) are deployed in mobile TV applications while digital video broadcasting-terrestrial (DVB-T) is already widely deployed for nomadic to portable reception conditions.

The need to transfer data between stations in wireless radio communication requires transfer of a reliable data stream between stations and internally within each station. Depending upon underlying transfer mechanisms, certain data transfers may require the buffering and storage of data blocks. For example, in a universal serial bus (USB) implementation, isochronous data transfers may be utilized to transmit digital television data to a storage location before demodulation by a software demodulator. Incoming isochronous data flows when stored in a fixed buffer location can lead to buffer overruns and data loss if the data is not regularly transferred from the buffer to a processor, leading to data synchronization issues.

BRIEF DESCRIPTION OF THE DRAWINGS

The present invention is illustrated by way of example and not as a limitation in the figures of the accompanying drawings, in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Embodiments of methods and systems for managing data loss in a computing system are described herein. In the following description, numerous specific details are set forth such as a description of a mechanism for reducing or eliminating data transfer synchronization errors in multi-band wireless systems to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

It would be an advance in the art to provide a data synchronization mechanism for multi-band wireless systems communicating over a plurality channels or spectrum bands to provide a non-interrupted broadcast stream. As an example, wireless stations may comprise a host processor, a flash memory device, a random access memory and a transceiver configured to communicate either sequentially or simultaneously over narrowband and wideband channels.

In one embodiment, a method for maintaining synchronization of data packets may comprise partitioning the data packets into a plurality of blocks with headers. A continuity counter is added to the header of each block of the plurality of blocks and the plurality of blocks is stored in a buffer memory. An availability of a communication channel is monitored and one or more of the plurality of blocks is erased when the communication channel is not available. The continuity counters are monitored to determine if one or more blocks have been erased and pseudo noise samples are inserted to replace the one or more erased blocks.

Figure 1:
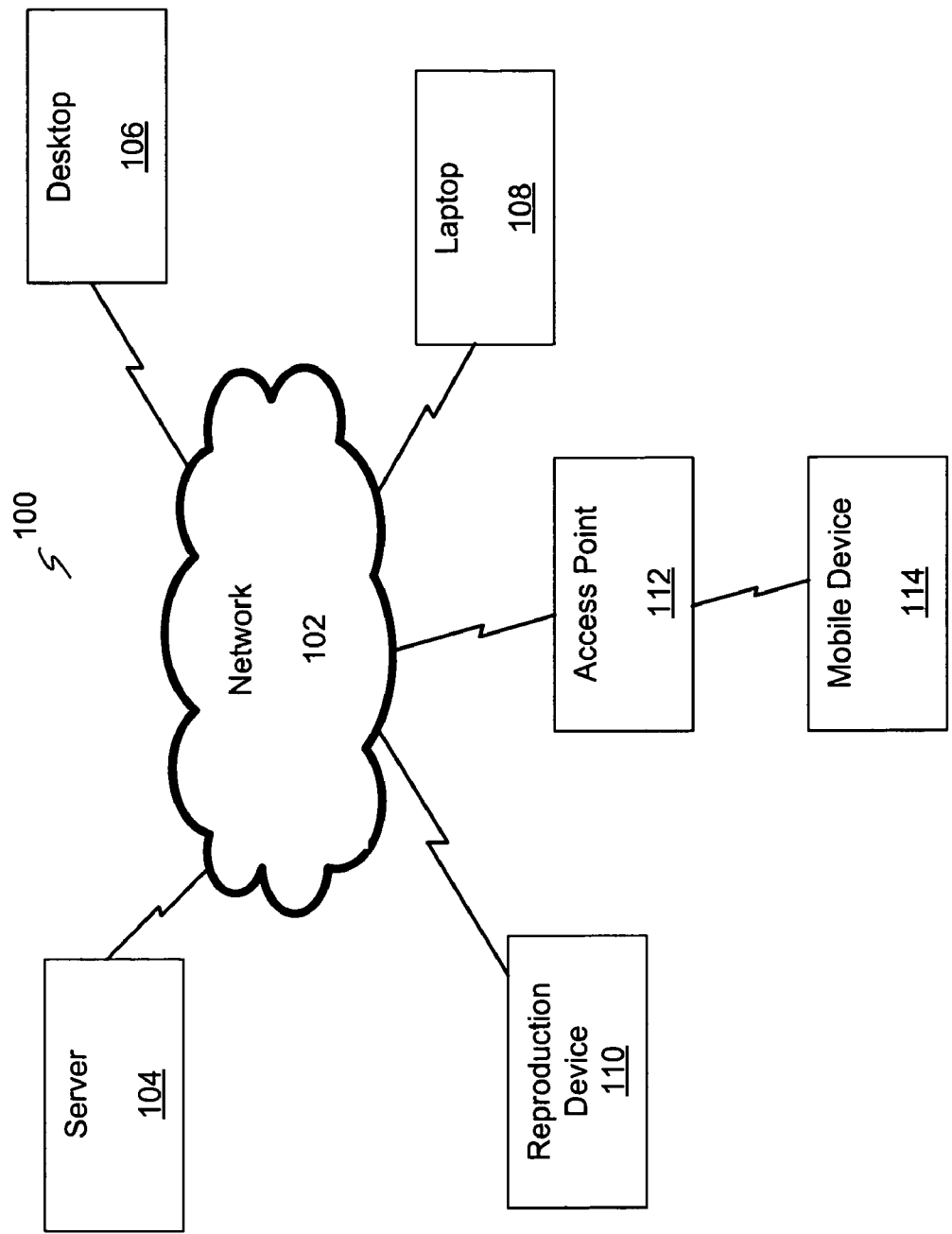
FIG. 1 is a block diagram of one embodiment of a networking environment.

Now turning to the figures, FIG. 1 illustrates various components of a networking environment 100 which may be utilized to implement various embodiments discussed herein. The environment 100 may include a network 102 to enable communication between various devices such as a server 104, a desktop computer 106 such as, for example, a workstation or a desktop computer, a laptop, netbook, or notebook computer 108, a reproduction device 110, such as, for example, a network printer, copier, facsimile, scanner, all-in-one device, etc., a wireless access point 112, which may comprise a cellular base station in various embodiments, and a personal digital assistant, smartphone, or mobile device 114. The network 102 may be any type of types of a computer network including an intranet, the Internet, and/or combinations thereof.

The devices 104-114 may communicate with the network 102 through wired and/or wireless connections. Hence, the network 102 may be a wired and/or wireless network. For example, as illustrated in FIG. 1, the wireless access point 112 may be coupled to the network 102 to enable other wireless-capable devices, such as the device 114 for example, to communicate with the network 102. In various embodiments, the wireless access point 112 may include traffic management capabilities. Also, data communicated between the devices 104-114 may be encrypted or cryptographically secured to limit unauthorized access.

The network 102 may utilize any communication protocol such as Ethernet, Fast Ethernet, Gigabit Ethernet, wide-area network (WAN), fiber distributed data interface (FDDI), Token Ring, leased line, analog modem, digital subscriber line (DSL) and its varieties such as high bit-rate DSL (HDSL), integrated services digital network DSL (IDSL), etc.), asynchronous transfer mode (ATM), cable modem, and/or or FireWire.

Wireless communication through the network 102 may be in accordance with one or more of the following: wireless local area network (WLAN), wireless wide area network (WWAN), code division multiple access (CDMA) cellular radiotelephone communication systems, global system for mobile communications (GSM) cellular radiotelephone systems, North American Digital Cellular (NADC) cellular radiotelephone systems, time division multiple access (TDMA) systems, extended TDMA (E-TDMA) cellular radiotelephone systems, third generation partnership project (3G) systems such as wide-band CDMA (WCDMA), etc. Moreover, network communication may be established by internal network interface devices (e.g., present within the same physical enclosure as a computing system) such as a network interface card (NIC) or external network interface devices (e.g., having a separate physical enclosure and/or power supply than the computing system to which it is coupled).

Further, digital television signals may be communicated along wideband and narrowband channels in the networking environment 100. Examples of wideband channel data in frequencies ranging from 5 to 8 megahertz (MHz) comprise digital video broadcasting terrestrial (DVB-T) and/or digital video broadcasting handheld (DVB-H) applications. Examples of narrowband channel data in frequencies substantially at or near 1.5 MHz include terrestrial digital multimedia broadcasting (T-DMB), digital audio broadcast (DAB), and single segment integrated services digital broadcasting terrestrial (ISDB-T) applications. The narrowband and/or wideband channel data is demodulated using hardware and/or software means by one or more of the devices 104-114.

Figure 2:
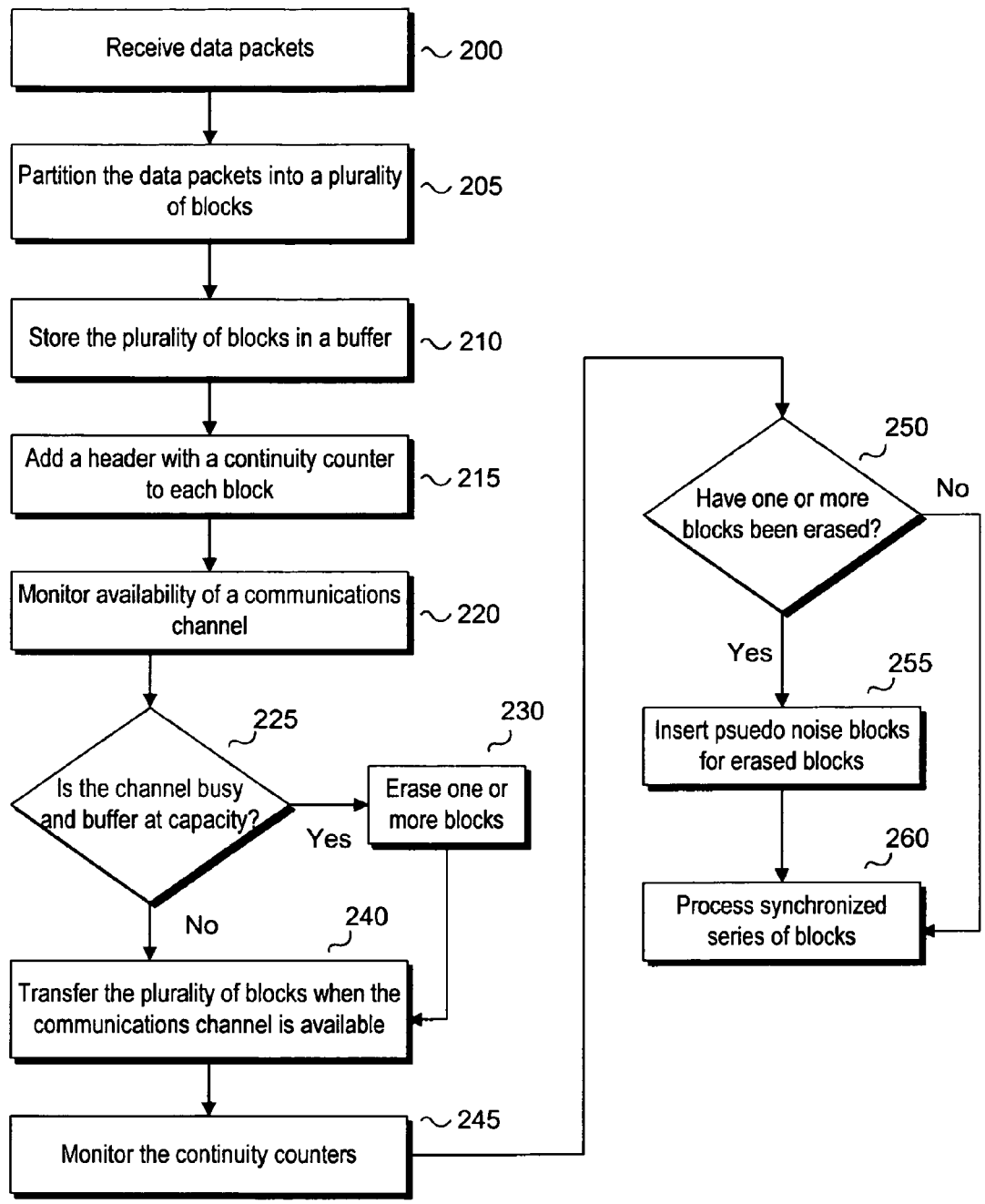
FIG. 2 is an embodiment of a method for buffering of channel data for software demodulation.

FIG. 2 is a flowchart of one embodiment for software demodulation of channel data. In this embodiment, the channel data is demodulated by an algorithm using a host processor. In element 200, data packets are received by a mobile device 114. The data packets are portioned into a plurality of blocks in element 205 of a selected size, such as a block size of 128 samples though the embodiment is not so limited. In other embodiments, the block size may be 64 samples or 256 samples in size. The plurality of blocks is stored in a buffer and a header is added to each block in elements 210 and 215. The buffer may be a hardware data collection module (HDCM) in the form of a volatile memory space such as a form of serial access memory (SAM) or a non-volatile memory space such as a flash memory.

A continuity counter is provided in each header which, in one example is a byte wide, though the embodiment is not so limited. In another embodiment, the header may be several blocks wide depending on the information provided in each header. The continuity counter in this example is a modulo 256 counter that counts from 1 to 255 before rolling back to a zero (0) value. The continuity counter is incremented by one for every block that is to be transferred.

An availability of a communications channel, such as a pathway provided by a universal serial bus (USB), is monitored for availability in element 220. The buffer continues to collect and store incoming data packets until the buffer space has reached a given capacity, which may be equal to the total storage capacity of the buffer or some other portion of the total capacity. If the communications channel is busy at the time that the buffer has reached capacity according to element 225, then one or more blocks are erased in element 230 until the communications channel become available in element 240. If the buffer is at capacity but the communications channel is available, then the plurality of blocks is transferred in element 240. The continuity counters in headers of the plurality of blocks are monitored, in one embodiment, by a host processor in element 245 to determine if one or more blocks have been erased, as indicated in element 250. The host processor determines a number of lost blocks through a relationship described in the continuity counter equation:

$$\text{Blocks\_lost} = CC(n) - CC(n-1) - 1 \bmod 256$$

where:
$CC(n)$=continuity counter of the nth block of data, & mod=modulo

As a first example, if $CC(n)=1$ and $CC(n-1)=254$, the equation would return a value of 2 for Blocks_lost.

As a second example, if $CC(n)=254$ and $CC(n-1)=254$, then the minimum number of Blocks_lost=255.

As another example, if 256 blocks are lost the continuity counter equation would return a value of Blocks_lost=0. At this point, synchronization might be lost. This may be overcome by choosing a continuity counter that is greater than 1 byte or 8 bits in length. In another embodiment, a synchronization byte is added to the header in addition to the continuity counter, resulting in 130 byte samples. In this embodiment, the host processor receives a sequence of bytes and will have to achieve byte synchronization at the start after locking onto several successive synch bytes that are 130 samples apart. The addition of a synch byte allows the software demodulator executed by the host processor to operate without loss of synchronization.

If it has been determined that blocks have been erased, then pseudo-noise samples are inserted to replace the erased blocks in element 255 to provide a synchronized set of blocks. In one embodiment, the pseudo-noise samples are normally distributed zero-mean pseudo-noise samples with a same variance as the data blocks. The synchronized set of data blocks are processed by the host processor using the software demodulator in element 260 to provide a demodulated transport stream. Examples of the demodulated stream may be one or more of a DAB, T-DMB, or a ISDB-T transport stream.

Figure 3:
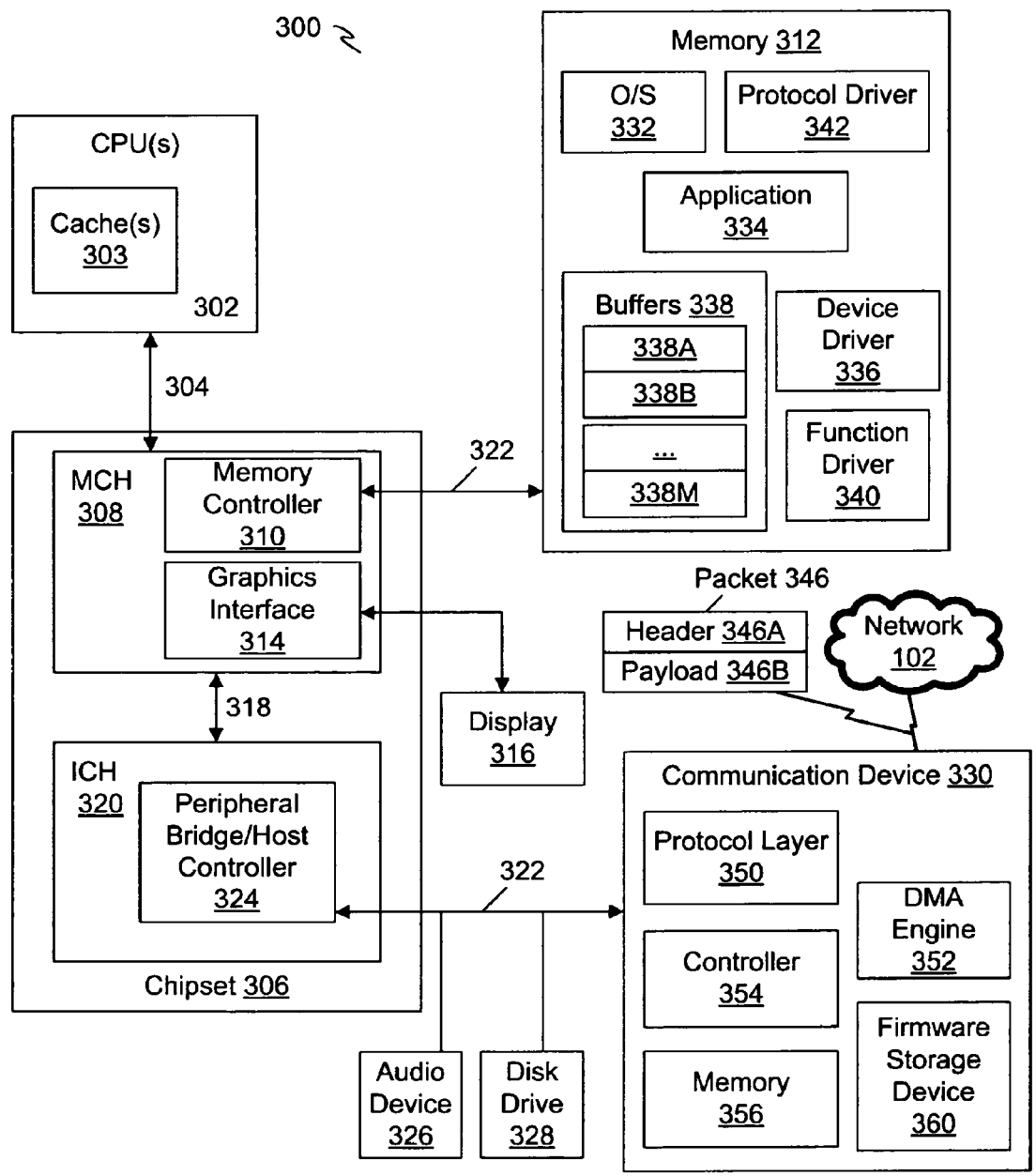
FIG. 3 is an embodiment of a computing system for software demodulation of narrowband channel data.

FIG. 3 illustrates a block diagram of a computing system 300, in accordance with various embodiments. One or more of the devices 104-114 discussed with reference to FIG. 1 may comprise one or more of the components of the computing system 300. The computing system 300 may include one or more host processors or central processing unit(s) (CPUs) 302 (which may be collectively referred to herein as "processors 302" or more generally "processor 302") coupled to an interconnection network or bus 304. The processors 302 may be any type of processor such as a general purpose processor, a network processor (which may process data communicated over a computer network (102)), etc. (including a reduced instruction set computer (RISC) processor or a complex instruction set computer (CISC)). Moreover, the processors 302 may have a single or multiple core design. The processors 302 with a multiple core design may integrate different types of processor cores on the same integrated circuit (IC) die. Also, the processors 302 with a multiple core design may be implemented as symmetrical or asymmetrical multiprocessors.

The processor 302 may include one or more caches 303, which may be private and/or shared in various embodiments. Generally, a cache stores data corresponding to original data stored elsewhere or computed earlier. To reduce memory access latency, once data is stored in a cache, future use may be made by accessing a cached copy rather than refetching or recomputing the original data. The cache 303 may be any type of cache, such a level 1 (L1) cache, a level 2 (L2) cache, a level 3 (L-3), a mid-level cache, a last level cache (LLC), etc. to store electronic data (e.g., including instructions) that is utilized by one or more components of the computing system 300.

A chipset 306 may additionally be coupled to the interconnection network 304. The chipset 306 may include a memory control hub (MCH) 308. The MCH 308 may include a memory controller 310 that is coupled to a memory 312. The memory 312 may store data, e.g., including sequences of instructions that are executed by the processor 302, or any other device in communication with components of the computing system 300. In various embodiments, the memory 312 may include one or more volatile storage or memory devices such as random access memory (RAM), dynamic RAM (DRAM), synchronous DRAM (SDRAM), static RAM (SRAM), etc. Nonvolatile memory may also be utilized such as a hard disk. Additional devices may be coupled to the interconnection network 304, such as multiple processors and/or multiple system memories.

The MCH 308 may further include a graphics interface 314 coupled to a display 316, e.g., via a graphics accelerator. In various embodiments, the graphics interface 314 may be coupled to the display device 316 via an accelerated graphics port (AGP). In various embodiments, the display device 316, which, for example may include a flat panel display or a cathode ray tube, may be coupled to the graphics interface 314 through, for example, a signal converter that translates a digital representation of an image stored in a storage device such as video memory or system memory into display signals that are interpreted and displayed by the display. The display signals produced by the display device 316 may pass through various control devices before being interpreted by and subsequently displayed on the display device 316.

As shown in FIG. 3, a hub interface 318 may couple the MCH 308 to an input/output control hub (ICH) 320. The ICH 320 may provide an interface to input/output (I/O) devices coupled to the computing system 300. The ICH 320 may be coupled to a bus 322 through a peripheral bridge or host controller 324, such as a peripheral component interconnect (PCI) bridge, a universal serial bus (USB) controller, etc. The controller 324 may provide a data path between the processor 302 and peripheral devices. Other types of topologies may be utilized. Also, multiple buses may be coupled to the ICH 320, for example, through multiple bridges or controllers. For example, the bus 322 may comply with the Universal Serial Bus Specification, Revision 1.1, Sep. 23, 1998, and/or Universal Serial Bus Specification, Revision 2.0, Apr. 27, 2000 (including subsequent amendments to either revision). Alternatively, the bus 322 may comprise other types and configurations of bus systems. Moreover, other peripherals coupled to the ICH 320 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), etc.

The bus 322 may be coupled to an audio device 326, one or more disk drive(s) 328, and a communication device 330, which in various embodiments may be a network interface card (NIC) or a tuner card. Other devices may be coupled to the bus 322. Also, various components such as the communication device 330 may be coupled to the MCH 308 in various embodiments. In addition, the processor 302 and the MCH 308 may be combined to form a single chip.

Additionally, the computing system 300 may include volatile and/or nonvolatile memory or storage. For example, nonvolatile memory may include one or more of the following: read-only memory (ROM), programmable ROM (PROM), erasable PROM (EPROM), electrically EPROM (EEPROM), a disk drive (e.g., 328), a floppy disk, a compact disk ROM (CD-ROM), a digital versatile disk (DVD), flash memory, a magneto-optical disk, or other types of nonvolatile machine-readable media capable of storing electronic data including instructions.

The memory 312 may include one or more of the following in various embodiments: an operating system (O/S) 332, application 334, device driver 336, buffers 338, function driver 340, and/or protocol driver 342. Programs and/or data stored in the memory 312 may be swapped into the disk drive 328 as part of memory management operations. The processor(s) 302) executes various commands and processes one or more packets 346 with one or more computing devices coupled to the network 102 (such as the devices 104-114 of FIG. 1). In various embodiments, a packet may be a sequence of one or more symbols and/or values that may be encoded by one or more electrical signals transmitted from at least one sender to at least one receiver (e.g., over a network such as the network 102). For example, each packet 346 may have a header 346A that includes information that may be utilized in routing and/or processing of the packet 346 may comprise the continuity counter, a sync byte, source address, a destination address, packet type, etc. Each packet may also have a payload 346B that includes the raw data or content the packet is transferring between various computing devices, for example, the devices 104-114 of FIG. 1, over a computer network such as the network 102.

In various embodiments, the application 334 may utilize the O/S 332 to communicate with various components of the computing system 300, e.g., through the device driver 336 and/or function driver 340. For example, the device driver 336 and function driver 340 may be used for different categories, e.g., device driver 336 may manage generic device class attributes, whereas the function driver 340 may manage device specific attributes (such as USB specific commands). In various embodiments, the device driver 336 may allocate one or more buffers (338A through 338M) to store packet data, such as the packet payload 346B. One or more descriptors (not shown) may respectively point to the buffers 338. In various embodiments, one or more of the buffers 338 may be implemented as circular ring buffers. Also, one or more of the buffers 338 may correspond to contiguous memory pages in various embodiments. Furthermore, a protocol driver 342 may implement a protocol driver to process packets communicated over the network 102, according to one or more protocols. In accordance with various embodiments, as discussed herein forth, reference to "function driver 340" may or may not refer to other types of drivers, e.g., including device driver 336, function driver 340, and/or protocol driver 342.

As illustrated in FIG. 3, the communication device 330 may include a network protocol layer 350 for implementing the physical communication layer to send and receive network packets to and from remote devices over the network 102. The network 102 may include any type of computer network such as those discussed with reference to FIG. 1. The communication device 330 may further include a direct memory access (DMA) engine 352, which may write packet data to buffers 338 to transmit and/or receive data over the network 102. Additionally, the communication device 330 may include a controller 354, which may include logic, such as a programmable processor for example, to perform communication device related operations. In various embodiments, the controller 354 may be a MAC (media access control) component. The communication device 330 may further include a memory 356, such as any type of volatile/nonvolatile memory (e.g., including one or more cache(s) and/or other memory types discussed with reference to memory 312).

In various embodiments, the communication device 330 may include a firmware storage device 360 to store firmware (or software) that may be utilized in management of various functions performed by components of the communication device 330. The storage device 360 may be any type of a storage device such as a non-volatile storage device. For example, the storage device 360 may include one or more of the following: ROM, PROM, EPROM, EEPROM, disk drive, floppy disk, CD-ROM, DVD, flash memory, a magneto-optical disk, or other types of nonvolatile machine-readable media capable of storing electronic data, including instructions.

In various embodiments, communication device 330 may include or comprise a USB tuner card configured to receive and process multimedia information. The tuner card may comprise a component that receives digital television signals for any of devices 104-114 described in FIG. 1. In various embodiments, the tuner card may also function as video capture card, allowing the card to record multimedia information onto a hard disk. In various embodiments, the tuner card may comprise a USB express card, a USB mini-card, a USB half-mini card or any other suitable USB form factor card. The tuner card may contain a receiver, tuner, hardware demodulator, and an analog-to-digital converter in various embodiments.

In various embodiments, the multimedia information comprises a digital television signal sent over network 102 from a media source (not shown) to the communication device 330. The multimedia information may comprise a constant bit rate signal for a given modulation rate, code rate and guard interval. The multimedia information may comprise generic coding of moving pictures and associated audio information. In various embodiments, the multimedia information comprises a DAB, T-DMB, ISDB-T, DVB-T/H, or MPEG2 transport stream. The multimedia information may contain multiple digital television channels or logical streams in each physical channel received from the media source. For example, the multimedia information may comprise various digital television channels, such as BBC 1, BBC 2, BBC 3 and BBC 4 in a single physical channel.

In various embodiments, the received multimedia information is converted from an analog signal to a digital signal using an analog-to-digital converter in the tuner card. In one embodiment, demodulation of wideband signals may also occur in the tuner card using a hardware demodulator. Demodulation may occur within the tuner card and/or part of the demodulation may occur outside the tuner card, for example, by the CPU 302. In various embodiments, the filtered multimedia information is sent from the communication device 330 to the chipset 306 over bus 322. As a result of the processing performed in the communication device 330, the multimedia information sent over bus 322 to chipset 306 comprises variable bit rate data even though the information received from the media source comprises constant bit rate data.

In various embodiments, bus 322 may comprise a USB bus. Isochronous mode is one of the four data flow types for USB devices (the others being Control, Interrupt and Bulk). Isochronous mode is commonly used for streaming multimedia data types such as video or audio sources. In isochronous mode, a device can reserve bandwidth on the bus making isochronous mode desirable for multimedia applications. In various embodiments, the data transfer described herein utilizes isochronous mode.

Figure 4:
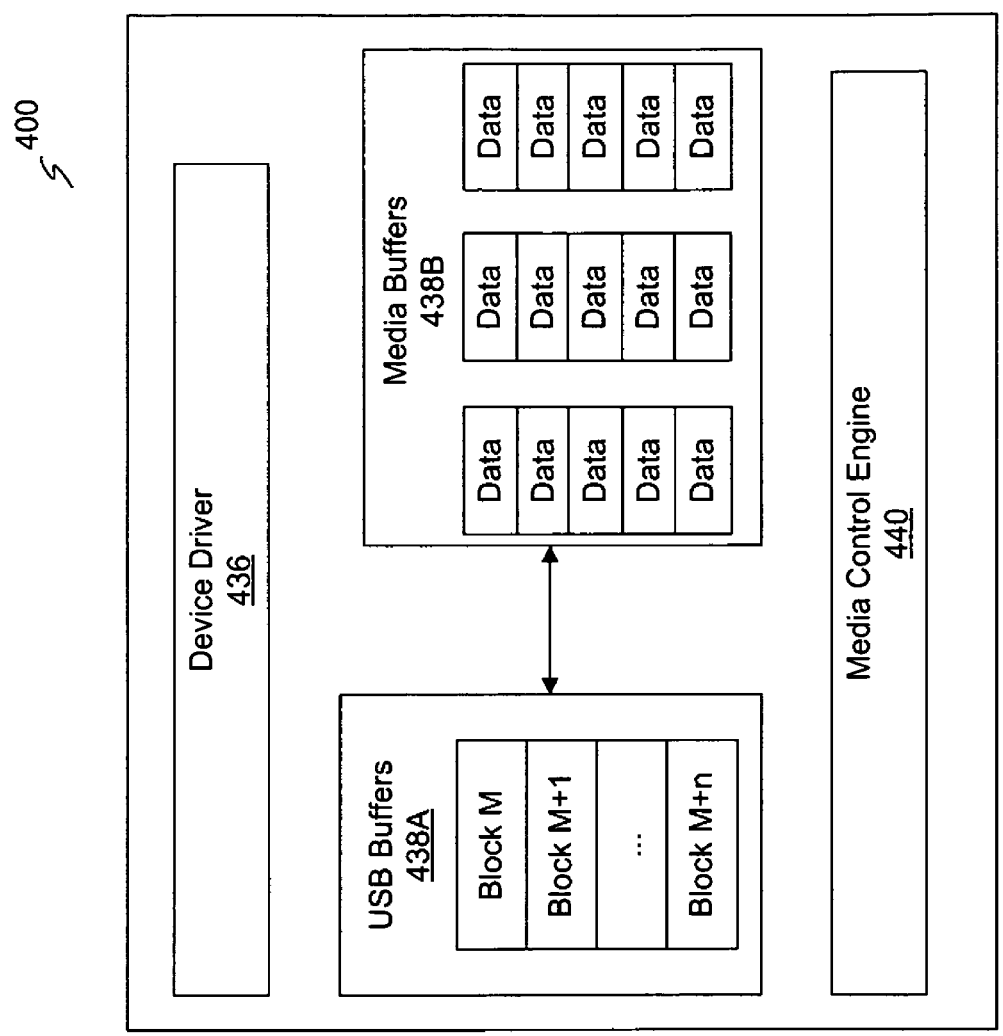
FIG. 4 is an embodiment of a memory for buffering of narrowband channel data.

FIG. 4 illustrates one embodiment of a memory 400. Memory 400 may be representative of, for example, memory 312 or memory 356 shown in FIG. 3. As shown in FIG. 4, memory 400 comprises multiple elements, such as a device driver 436, USB buffers 438A, media buffers 438B and media control engine 440. The embodiments, however, are not limited to the elements shown in FIG. 4.

Device driver 436 may comprise a component that handles interactions between memory 400 and any of the elements of computing system 300, for example. Device driver 436 may be responsible for allocating and managing buffers 438A and 438B. In various embodiments, device driver 436 allocates USB buffers 438A to be as large as the USB processing stack will allow. Device driver 436 may also allocate media buffers 438B, the size of media buffers 438B selected to reduce or eliminate latency when the multimedia information is retrieved.

USB buffers 438A may comprise a permanent or temporary allocation of memory to store multimedia information. As shown in FIG. 4, the multimedia information stored in USB buffers 438A may comprise contiguous or non-contiguous data. If a system operating in isochronous mode attempts to retrieve the multimedia information stored in USB buffers 438A, contiguous data is transferred in an orderly manner without loss of synchronization and non-contiguous data may be transformed into contiguous data as provided by embodiments of the invention.

In various embodiments, device driver 436 controls the making of a copy of the multimedia information from USB buffers 438A to media buffers 438B. In a case of non-contiguous data, missing blocks of multimedia information may be replaced with pseudo-noise samples as provided in element 255 of FIG. 2 to resolve potential synchronization errors when processed by the software demodulator at the processor 302. The pseudo-noise samples may be noise samples saved in a memory and/or the pseudo-noise samples may be generated using an optional pseudo-number generator (not shown).

Media control engine 440 may comprise a component that controls requests for multimedia information. An example of a media control engine 440 is the Microsoft® DirectShow® application programming interface (API) by Microsoft® Corporation of Redmond, Wash. DirectShow is a media-streaming architecture for the Microsoft Windows® platform that allows applications to perform high-quality video and audio playback or capture. In various embodiments, media control engine 440 may retrieve requested multimedia data from media buffers 438B to fulfill requests for specific multimedia information, for example, a specific television channel or program and provide the requested information to processor 302 for further processing and playback.

Figure 5:
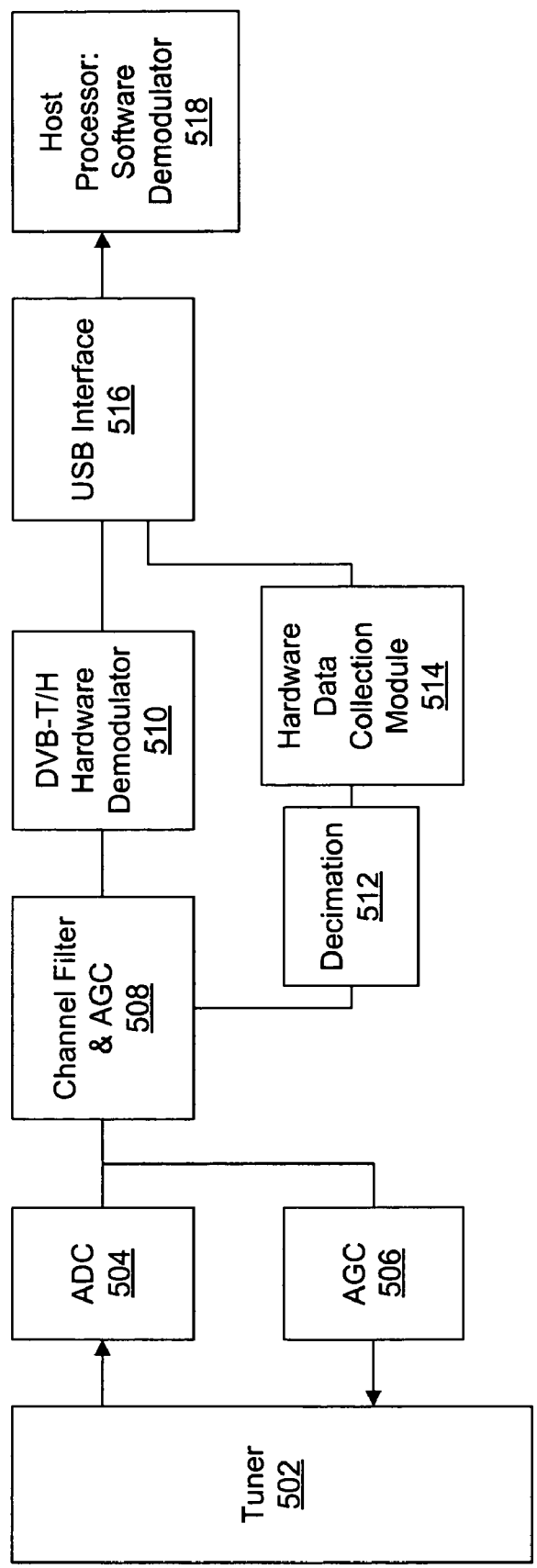
FIG. 5 is a block diagram of an embodiment of a mobile device configured for hardware and software demodulation.

FIG. 5 is a block diagram of an embodiment of a mobile device configured for hardware and software demodulation. A tuner 502 is provided to process one or more digital television signals, such as wideband and narrowband signals. The digital television signals may be transferred to the tuner 502 using a wired or wirelessly over-the-air. Output from the tuner 502 is directed to an analog to digital converter 504 to convert an input analog voltage to a digital output which may be sent to an automatic gain control module 506 and/or to a channel filter/automatic gain control module 508. The channel filter 508 is selectively designed to parse an incoming data stream among wideband channel data and narrowband channel data. In this embodiment, the wideband channel data, such as DVB-T and/or DVB-H channel data is directed to a hardware demodulator 510. In another embodiment (not shown), wideband demodulation occurs through software demodulation as replacement for or in conjunction with hardware demodulation provided by the hardware demodulator 510. Demodulated wideband data is then directed to a USB interface 516.

The narrowband channel data is directed to decimation 512 to reduce a number of samples to be provided for software demodulation. Decimation removes in a predictable and orderly manner the number of samples transferred to a hardware data collection module 514. In another embodiment (not shown), demodulation 512 is eliminated or reduced as software and processor capabilities allow higher throughput of sampled data. The hardware data collection module (HDCM) 514 is a memory module or buffer and operates as previously described in FIG. 2. The buffered data from the HDCM 514 is transferred to the USB interface 516 when a communications channel is available to the host processor 518 to demodulate the narrowband data using a software demodulator.

Figure 6:
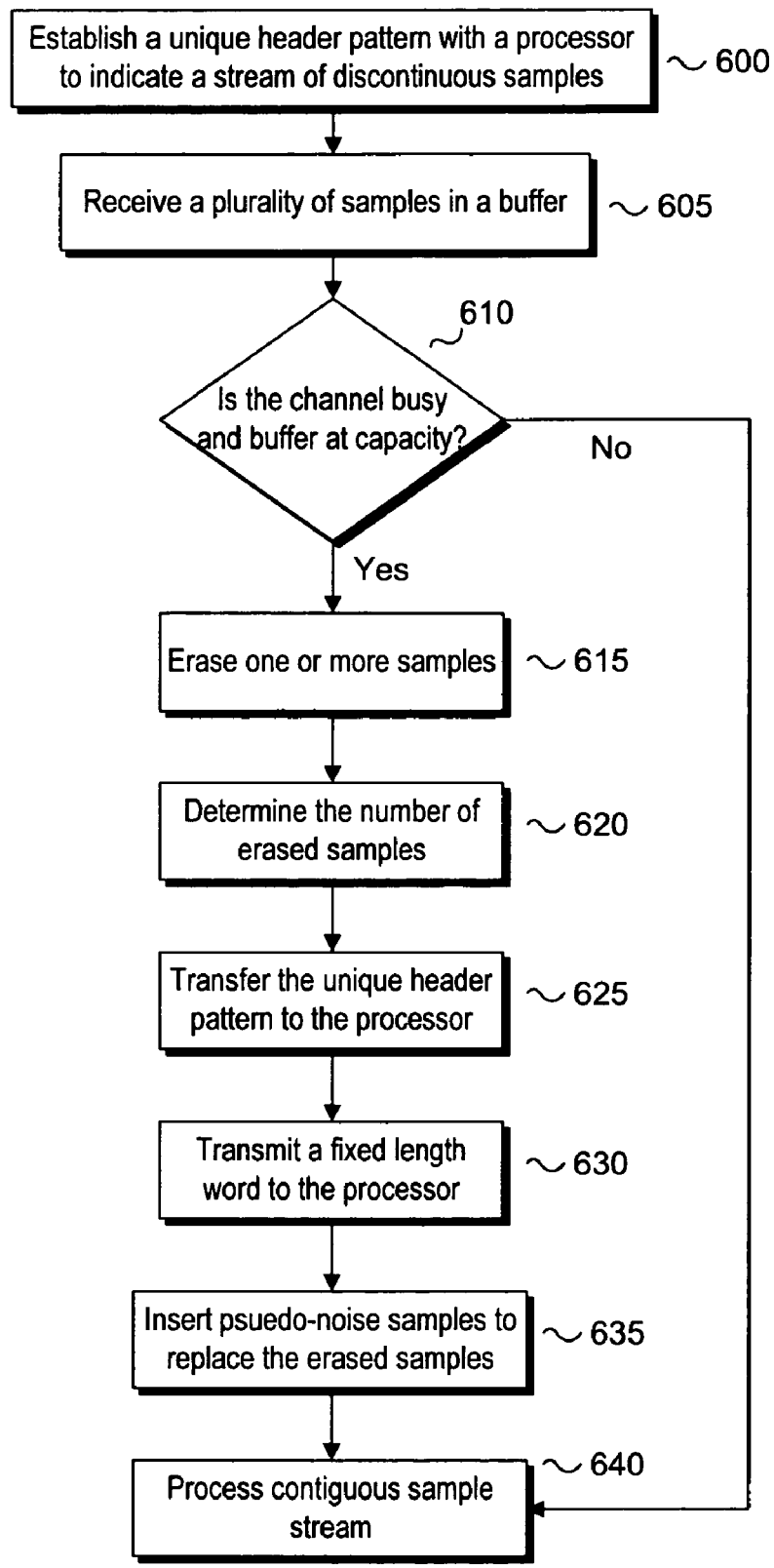
FIG. 6 is an alternate embodiment of a method for buffering of channel data for software demodulation.

FIG. 6 is an alternate embodiment of a method for buffering of channel data for software demodulation. In element 600, a unique header pattern is established with a processor to indicate a stream of discontinuous samples. The unique header pattern, for example is a predefined 6-byte word in a header that may be used to flag or alert a processor of a condition. By flagging the processor, such as the processor 302 of FIG. 3, the processor is notified of a discontiguous data stream, or a break in the data. The unique header pattern may be less than 6 bytes, or more than 6 bytes in other embodiments. Optionally, a shift register may be applied to prevent headers from matching the unique header pattern. If a shift register is applied, the normal header data is passed through a shift register. If the normal header data processed by the shift register should ever become equal to the unique header pattern, then the shift register toggles a bit to stop it from becoming equal to the pre-defined unique header pattern.

A plurality of samples is received in a buffer in element 605 such as the HDCM 514 of FIG. 5. The plurality of samples collect in the buffer until the buffer reaches a capacity in element 610. If a communications channel, such as the USB interface 516 of FIG. 5, is busy when the buffer reaches capacity, then one or more samples are erased in element 615. Otherwise, the samples are directed to a software demodulator to process a contiguous sample stream in element 640. The number of samples erased is determined in element 620 and the unique header pattern is transferred to the processor 302 in element 625 to indicate a discontiguous data stream. A fixed length word is transmitted to the processor 302 in element 630 to indicate the number of samples erased. In one embodiment, the fixed length word is two bytes in length. In other embodiments, the fixed length word is one byte in length or greater than two bytes in length. Pseudo-noise samples are inserted to replace the erased samples in element 635 either through generation of pseudo-noise samples by the processor or by replacing the erased samples with pseudo-noise samples from a memory location to provide a contiguous sample stream. The contiguous sample stream is processed in element 640 by the processor 302.

Embodiments of this invention may be used as or to support a software program executed upon some form of processing core (such as a processor of a computer) or otherwise implemented or realized upon or within a machine-readable medium. A machine-readable medium includes any mechanism for storing information in a form readable by a machine (e.g., a computer). For example, a machine-readable medium can include such as a read only memory (ROM); a random access memory (RAM); a magnetic disk storage media; an optical storage media; and a flash memory device, etc.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Modifications may be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for maintaining synchronization of data packets in a computing system, comprising:
    receiving data packets by the computing system;
    establishing a unique header pattern with a processor to indicate a discontiguous stream of data packets;
    partitioning the data packets into a plurality of blocks;
    storing the plurality of blocks in a buffer in the computing system;
    adding a header with a continuity counter to each block of the plurality of blocks;
    erasing one or more blocks of the plurality of blocks to form remaining blocks;
    transferring the remaining blocks over a communication channel in the computing system;
    processing the remaining blocks through a shift register;
    receiving the unique header pattern;
    determining that the remaining blocks represent a discontiguous data stream, based on the unique header pattern; and
    inserting pseudo noise blocks to replace the one or more erased blocks in the plurality of blocks to provide a stream of contiguous data for demodulation.

2. The method of claim 1, wherein the data is multimedia data received by the computing system as a stream of data packets.

3. The method of claim 2, further including decimating the data packets.

4. The method of claim 1, wherein the pseudo noise blocks are generated by the processor.

5. The method of claim 1, further including adding a synchronization byte to the header.

6. The method of claim 1, wherein the data packets comprise wideband data and narrowband data.

7. The method of claim 1, wherein a block size of each block of the plurality of blocks is equal to 128 samples.

8. A method for processing multimedia samples in a computing system, comprising:
    establishing a unique header pattern with a processor in the computing system to indicate a discontiguous sample stream;
    receiving a plurality of samples in a memory buffer of the computing system;
    erasing one or more samples from the plurality of samples when the memory buffer has reached a capacity to form a number of discontiguous samples;
    determining a number of erased samples;
    transferring the unique header pattern to the processor;
    transmitting a fixed length word to the processor in the computing system to provide the number of erased samples;
    transferring the number of discontiguous samples to the processor;
    processing a header pattern for each sample of the number of discontiguous samples through a shift register; and
    inserting pseudo-noise samples to replace the erased samples to form a contiguous sample stream.

9. The method of claim 8, further including using the shift register to prevent the header pattern from matching the unique header pattern.

10. The method of claim 9, wherein the unique header pattern is 6 bytes in length.

11. The method of claim 8, wherein the buffer is a flash memory.

12. The method of claim 8, wherein the fixed length word is two bytes in length.

13. A system for multi-band wireless communications, comprising:

a communication device configured to receive data packets, wherein the communication device is configured to:
partition the data packets into a plurality of blocks;
store the plurality of blocks in a buffer;
add a header with a continuity counter to each block of the plurality of blocks;
erase one or more blocks of the plurality of blocks when the buffer is at capacity to form remaining blocks; and
establish a unique header pattern with a processor to indicate a discontiguous stream of data packets;

the processor to:
process the remaining blocks through a shift register;
receive the unique header pattern;
determine that the remaining blocks represent a discontiguous data stream based on the unique header pattern; and
insert pseudo noise blocks to replace the one or more erased blocks to provide a synchronized set of blocks; and a bus to transfer the plurality of blocks from the communication device to the processor.

14. The system of claim 13, wherein the data packets comprise narrowband data.

15. The system of claim 13, further including decimating the data packets.

16. The system of claim 13, wherein the pseudo noise blocks are generated by the processor.

17. The system of claim 13, further including adding a synchronization byte to the header.

18. The system of claim 13, wherein the data packets comprise wideband data and narrowband data.

19. The system of claim 13, wherein a block size of each block of the plurality of blocks is equal to 128 samples.

* * * * *

UNITED STATES PATENT AND TRADEMARK OFFICE
CERTIFICATE OF CORRECTION

| | | |
|---|---|---|
| PATENT NO. | : 8,059,687 B2 | Page 1 of 1 |
| APPLICATION NO. | : 12/316876 | |
| DATED | : November 15, 2011 | |
| INVENTOR(S) | : Bernard Arambepola et al. | |

It is certified that error appears in the above-identified patent and that said Letters Patent is hereby corrected as shown below:

In drawing sheet 2 of 6, figure 2, in Box 255, line 1, delete "psuedo" and insert -- pseudo --, therefor.

In drawing sheet 6 of 6, figure 6, in Box 635, line 1, delete "psuedo" and insert -- pseudo --, therefor.

Signed and Sealed this
Tenth Day of January, 2012

David J. Kappos
*Director of the United States Patent and Trademark Office*